(12) United States Patent
O'Connell et al.

(10) Patent No.: US 11,882,013 B2
(45) Date of Patent: Jan. 23, 2024

(54) NETWORK TRAFFIC MONITORING FOR ANOMALOUS BEHAVIOR DETECTION

(71) Applicant: Hewlett Packard Enterprise Development LP, Houston, TX (US)

(72) Inventors: John O'Connell, Isere (FR); Ravi Saxena, Karnataka (IN); Bo Wang, Shanghai (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 88 days.

(21) Appl. No.: 17/492,568

(22) Filed: Oct. 2, 2021

(65) Prior Publication Data
US 2023/0053883 A1    Feb. 23, 2023

(30) Foreign Application Priority Data

Aug. 18, 2021    (EP) ..................................... 21306125

(51) Int. Cl.
    *G06F 15/173*     (2006.01)
    *H04L 43/065*     (2022.01)
    (Continued)

(52) U.S. Cl.
    CPC ........ *H04L 43/065* (2013.01); *H04L 43/0817* (2013.01); *H04L 43/0823* (2013.01); *H04L 67/141* (2013.01); *H04L 67/143* (2013.01)

(58) Field of Classification Search
    CPC . H04L 43/0823; H04L 67/141; H04L 67/143; H04L 43/0817
    (Continued)

(56) References Cited

U.S. PATENT DOCUMENTS

| 11,115,426 B1 * | 9/2021 | Pazhyannur ........ H04L 41/0686 |
| 2005/0021740 A1 * | 1/2005 | Bar ....................... H04L 63/145 |
| | | 709/224 |

(Continued)

FOREIGN PATENT DOCUMENTS

| WO | WO-2013049675 A1 * | 4/2013 | ............. H04L 41/12 |
| WO | WO-2019142180 A1 * | 7/2019 | ........ B60W 50/0205 |

(Continued)

OTHER PUBLICATIONS

3GPP TS 23.503, "3rd Generation Partnership Project; Technical Specification Group Services and System Aspects; Policy and charging control framework for the 5G System (5GS); Stage 2", Release 16, V16.8.0, Technical Specification, Mar. 2021, 120 pages.

(Continued)

*Primary Examiner* — Lan Dai T Truong
(74) *Attorney, Agent, or Firm* — Hewlett Packard Enterprise Patent Department

(57) ABSTRACT

Example implementations relate to changing a status of a device responsive to detecting an anomaly. A traffic pattern of a device may be monitored across a network. It may be determined that the monitored traffic pattern deviates from an expected traffic pattern of the group of devices by a threshold. Responsive to determining that the devices deviates from the expected traffic pattern, packet data transmitted by the device may be inspected. It may be determined that the inspected packet data transmitted by the device is anomalous. The status of the device may be changed responsive to determining that the packet data transmitted by the device is anomalous.

18 Claims, 7 Drawing Sheets

(51) Int. Cl.
*H04L 43/0817* (2022.01)
*H04L 67/143* (2022.01)
*H04L 67/141* (2022.01)
*H04L 43/0823* (2022.01)

(58) Field of Classification Search
USPC .......................................................... 709/224
See application file for complete search history.

(56) References Cited

U.S. PATENT DOCUMENTS

| | | | |
|---|---|---|---|
| 2016/0242088 A1* | 8/2016 | Wang | H04W 36/22 |
| 2016/0344754 A1* | 11/2016 | Rayapeta | H04L 63/0227 |
| 2017/0279838 A1 | 9/2017 | Dasgupta et al. | |
| 2021/0218661 A1* | 7/2021 | Wang | H04L 12/4641 |
| 2022/0141192 A1* | 5/2022 | Silveira | H04L 63/20 |
| | | | 726/15 |
| 2022/0321588 A1* | 10/2022 | Navon | H04L 63/1441 |

FOREIGN PATENT DOCUMENTS

| | | | |
|---|---|---|---|
| WO | 2020/118375 A1 | 6/2020 | |
| WO | WO-2022033944 A1 * | 2/2022 | ................ H04J 3/06 |
| WO | WO-2022106064 A1 * | 5/2022 | ............. H04L 12/14 |
| WO | WO-2022263884 A1 * | 12/2022 | |

OTHER PUBLICATIONS

Hamza et al., "Detecting Volumetric Attacks on IoT Devices via SDN-Based Monitoring of MUD Activity", Association for Computing Machinery, Apr. 3-4, 2019, pp. 1-13.
Metaswitch, "What is the 5G User Plane Function (UPF)?", A Microsoft Company, 2021, 5 pages.
Tornkvist et al., "Charging and Billing Architecture for 5G Network", Journal of ICT, 2019, 10 pages.
Yu et al., "Radar: A Robust Behavioral Anomaly Detection for IoT Devices in Enterprise Networks", CyLab, May 21, 2019, 15 pages.

* cited by examiner

NETWORK TRAFFIC MONITORING FOR ANOMALOUS BEHAVIOR DETECTION

BACKGROUND

Network functions and services have traditionally been provided on dedicated and proprietary hardware appliances. Examples of such network functions, also known as Physical Network Functions (PNFs), include firewalls, load balancers, deep packet inspectors, and network address translators, to name just a few. Traditionally, physical network functions involve physical installation at each site where such functions are provided.

"Network Functions Virtualization" is a design approach, particularly in the telecommunications industry, to transform physical network functions into discrete "Virtual Network Functions" by implementing physical network functions as software that can be hosted and run on hardware.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
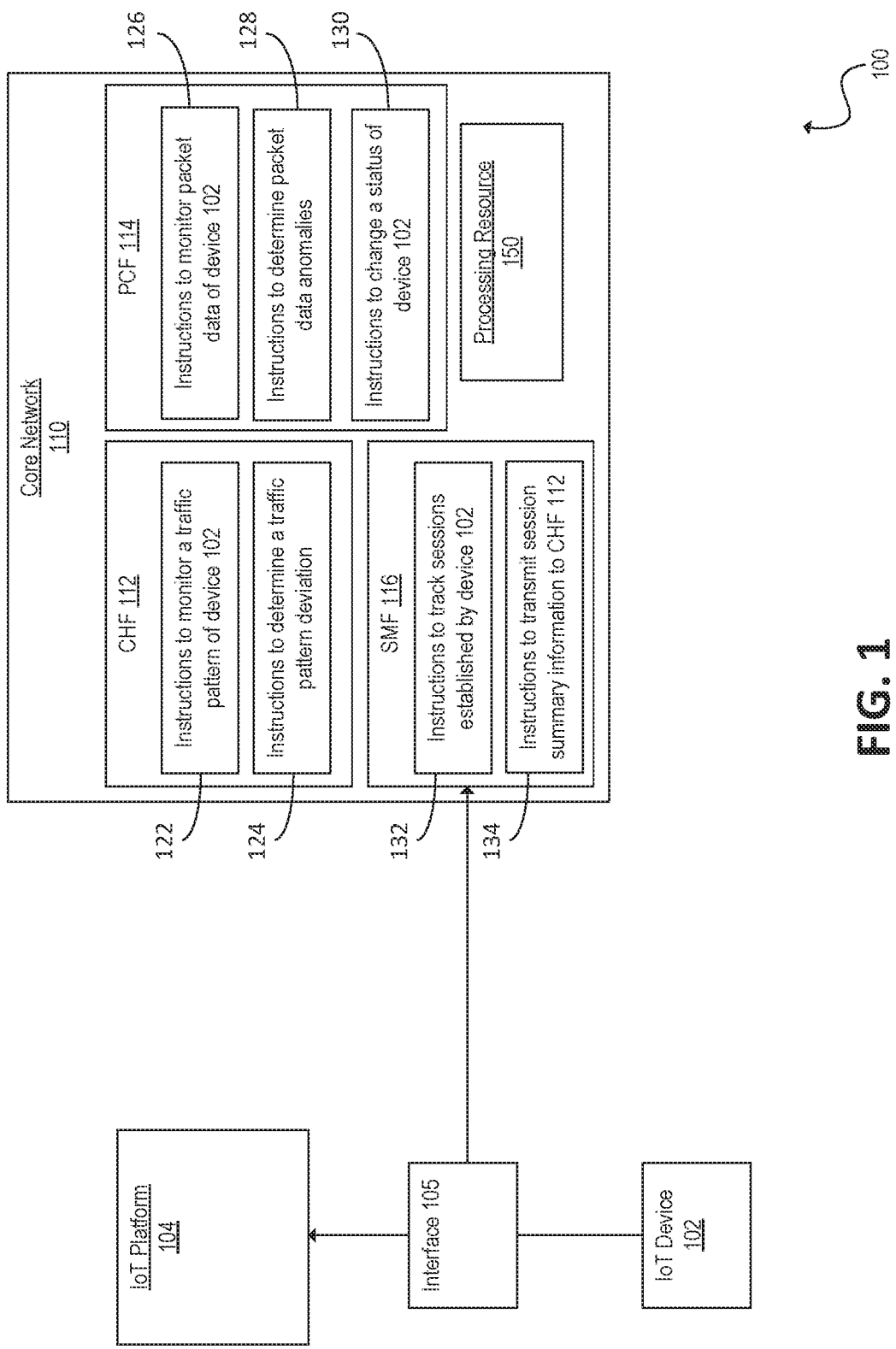
FIG. 1 is an example system of network functions including anomaly detection functionality for changing the status of a device.

An electronic communications device, e.g. a computer, smartphone, etc., may be hardware in communication with a network, such as a telecommunications or Wi-Fi network, Internet of Things (IoT) devices are objects or equipment having network connectivity. In the Internet of Things, "things" may refer to a wide variety of devices that interact with the environment in which they are placed. Each "thing" or IoT device may comprise a processor and machine-readable instructions and may be assigned a unique identifier (for example, an IP address) allowing it to collect and exchange data over a network.

IoT devices may be specially configured for a particular purpose. For example, an IoT device may be a sensor and may be configured to transmit data about a local environment at particular intervals across a network. Accordingly, an IoT device may allow for remote monitoring of the environment in which it is placed (e.g. temperature monitoring, movement monitoring, etc.). In some examples, an IoT device may allow for remote control of that environment (e.g., turning on a light bulb, etc.). Industrial IoT devices (IIoT) are IoT devices deployed in industrial environments and/or applications, such as assembly line monitoring in a manufacturing plant or pressure regulation in an energy plant. Some non-limiting examples of IoT devices include heart monitoring implants, biochip transponders on farm animals, smart kitchen devices, cameras, automobiles with built-in sensors, various sensors, smart lights, smart thermostat systems, etc.

In some examples, an IoT device may be configured to operate on multiple networks. An IoT device may be configured to communicate over a primary network slice of a telecommunications network for example, and may resort to operation on a secondary network, such as a Wi-Fi network, if the primary network is down, if a data consumption limit is reached, if pre-specified resources of the primary network have been exhausted, etc. In some examples, an IoT device may be configured to operate on different network slices, or in other words, virtualized and independent logical network on the same physical network infrastructure. The IoT device, in some examples, may be configured to conduct operations or communications of a first type over a first network slice and operations or communications of a second type over a second network slice. In some examples, the IoT device may be configured to communicate over the first network slice, and may be further configured to communicate over the second network slice as a backup, e.g. where the IoT device cannot connect to the second network slice, where the IoT device has reached a data limit quota over the first network slice, etc. In some examples, the IoT device may be configured to communicate over a first network slice a first percentage of time, and communicate over a second network slice a second percentage of time.

To verify that an IoT or other electronic device is operating properly and/or in accordance with configured policies, an IoT anomaly detection solution may be employed. IoT anomaly detection may include the detection of anomalies in the telemetry data that the IoT device generates. Network analytics systems may analyze this telemetry data to detect corruption of data, abnormal readings, missing data, etc.

Another solution to detect network device anomalies may be the detection of anomalies in a device's traffic pattern, e.g. where the traffic pattern is unexpected relative to the particular configuration of the IoT device, or relative to other IoT devices of a particular IoT device group as will be described in further detail below. For example, a network function may monitor and detect anomalies in the frequency of transmissions of an IoT device. These anomalies may include; a volume of data transmitted by the device above or below a threshold; a frequency above or below a threshold at which the device establishes a session; the establishment of one or more sessions for a duration above or below a threshold; etc.

Anomalies may further include a frequency of sessions established and/or a volume of data transmitted on a particular network slice. For example, a device may be configured to transmit data over a primary network slice, and may be configured to transmit data over a backup or secondary network slice where the primary slice is unavailable, a quota has been exceeded, and/or where the device is unable to connect to the primary network slice. A device traffic pattern anomaly may include, for example, the device transmitting a greater amount of data over the backup data slice than the primary network slice, and/or the device establishing a threshold number of sessions over the backup data slice within a period of time.

Device traffic anomalies may occur for a variety of reasons, and may or may not be due to a fault of the device or network. A few examples of device or network faults that may lead to anomalies may include, for example: an improperly configured device, a device having improper authentication credentials, improper use of the device, an incorrect policy applied to the device, a fault in the network to which the device is trying to connect, an improperly categorized device, etc. A few examples of proper behavior that may result in traffic anomalies may include, for instance, a software update being downloaded to the device over the network, the device deployed in a location where a primary network is unavailable such that the device relies on a secondary network, the device being tested or debugged, the device transmitting more frequent data responsive to an event, etc.

In some examples, a traffic pattern of a group of devices may be monitored. By monitoring their traffic pattern, it may be determined whether the traffic pattern of a device of the group of devices deviates from an expected traffic pattern of the group of devices, and packet data transmitted by the device may be monitored if the device does deviate from the expected traffic pattern by a threshold. If the packet data transmitted by the device is determined to be anomalous, the status of the device may be changed as will be described further below.

Monitoring IoT device traffic patterns to identify an anomaly may be implemented as an extension of current telecommunication standards, including $3^{rd}$ Generation Partnership Project (3GPP) standards. For example, anomaly detection capabilities may be incorporated into network functions such as; a Charging Function (CHF) which collects session usage information for online or offline charging; a Policy Control Function (PCF), also known as a PCRF in $4^{th}$ Generation (4G) standards, for policy determination and enforcement applied to network sessions; etc. FIG. 1 is an example system 100 of network functions including anomaly detection functionality.

System 100 includes core network 110. Networks, and particularly telecommunication networks, include a core, or backbone network for providing services to customers connected to the network. The core network may also enable the exchange of information between different sub-networks. A core network may include any number of network functions to provide services, such as authentication, policy management, charging, etc.

Core network 110 may include processing resource 150. Processing resource 150 may represent any number of physical processors, any of which may include a central processing unit (CPU), graphics processing unit (GPU), microprocessor, and/or any other hardware device suitable for retrieval and execution of instructions of the network functions illustrated at core network 110. Processing resource 150 (and any other processor described herein) may be implemented by any number of processors which may be local to a single physical device, or may be spread among any number of devices.

Processing resource 150 may fetch, decode, and execute example program instructions 122-134, and/or other instructions. As an alternative or in addition to retrieving and executing instructions, processing resource 150 may include at least one electronic circuit comprising a number of electronic components for performing the functionality of instructions 122-134, and/or other instructions. Similarly, processing resource 150 may include at least one electronic circuit comprising a number of electronic components for performing the functionality of instructions 122-134, and/or other instructions.

Any of the network functions included in core network 110 may each be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory computer readable storage medium, and the hardware for the engines may include at least one processing resource, e.g. processing resource 150, to execute those instructions. In some examples, the hardware may also include other electronic circuitry to at least partially implement at least one of the engine(s). In some examples, the at least one computer readable storage medium may store instructions that, when executed by the at least one processing resource, at least partially implement some or all of the engine(s). In such examples, a computing device may include the at least one computer readable storage medium storing the instructions and the at least one processing resource to execute the instructions. In other examples, the engine may be implemented by electronic circuitry.

In some examples, core network 110 may include Charging Function (CHF) 112. CHF 112 may provide a number of charging services, including but not limited to, Account Balance Management Functions (ABMF) for balance or quota management, Rating Functions (RF) for measuring events, and credit reservation. CHF 112, in some examples, may act as a charging gateway for Charging Data Record (CDR) generation. CHF 112 may in some examples be an interface to an offline billing system.

CHF 112 may, in some examples, collect data usage information, e.g. from Session Management Function (SMF) 116, to perform online or offline charging. In some examples, SMF 116 may manage network sessions and generate session usage data. Additionally, CHF 112 may manage spending limits such as monthly quotas. In some examples, CHF 112 may generate an alert where a device has exceeded or is consuming resources at a rate that will exceed a subscription usage limit. In some examples, CHF 112 may redirect sessions to an account re-charge server where a resource limit is exceeded.

As illustrated in example FIG. 1, CHF 112 may include instructions 122 to monitor a traffic pattern of device 102. Device 102 may, in some examples, be an IoT device. IoT devices, unlike more general purpose devices such as smart phones, may have specialized purposes with more predictable behavior. Each IoT device may have a predictable traffic pattern range. For example, a properly behaving IoT device may, transmit or receive traffic at a predictable frequency range, transmit or receive traffic within a predictable volume range, and/or may conduct network sessions within a predictable duration range. The range that is considered predictable may depend on an IoT device profile of the device, the configuration of the device, the classification of the device, etc. For example, a properly behaving IoT device may, transmit or receive traffic at a predictable frequency range, transmit or receive traffic within a predictable volume range, and/or may conduct network sessions within a predictable duration range. Traffic of an IoT device may also have predictable behavior over particular time periods. For instance, an IoT device may generate a predictably larger range of traffic during business hours.

As an illustrative example, a predictable traffic pattern range of an IoT device may be a number of established sessions of 0-5 times a day. As another example, a predictable traffic pattern range for an IoT device may be a session length between 30 seconds to 360 seconds per session. As another example, a predictable traffic pattern range of an IoT device may be a transmission of no more than ten kilobytes of data per day.

In some examples, IoT device 102 may be configured to transmit data to IoT platform 104, e.g., via interface 105. In some examples, IoT platform 104 may reside on a network server and may collect data sent by any number of devices, including IoT device 102. In some examples, IoT Platform 104 may be an IoT application, or a platform hosting multiple IoT applications. In some examples, IoT Platform 104 may be a platform capable of routing traffic from IoT device 102 to a destination IoT application.

Interface 105 may be an interconnect between mobile infrastructure and the Data Network (DN). For example, interface 105 may be a User Plane Function (UPF) in the case of a $5^{th}$ Generation (5G) network, or a Packet Data Network Gateway (PGW) in the case of a $4^{th}$ Generation (4G) network, and may be an interface between IoT device 102 and IoT platform 104, as well as an interface between SMF 116 and the UPF. A UPF may enforce policies of PCF 114. Although one interface 105 is illustrated from purposes of clarity and conciseness, any number of interfaces 105 may be deployed depending on the network topology. Where more than one interface 105 is deployed, interface 105 may interface between the two, i.e. in the case of an Intermediate UPF (I-UPF) and a UPF Session Anchor).

CHF 112 may monitor a traffic pattern between IoT device 102 and IoT platform 104 according to instructions 122. In an example, CHF 112 may receive the traffic pattern data in the form of summary information from SMF 116. Specifically, CHF 112 may collect data usage information from SMF 116. For instance, SMF 116 may include instructions 132 to track sessions established by device 102. For example, SMF 116 may receive traffic steering rules from PCF 114. SMF 116, in some examples, may pass these steering rules to the UPF for enforcement. In some examples, SMF 116 may receive the data usage information from the UPF.

SMF 116 may further include instructions 134 to transmit a summary of a session after or during the session to CHF 112. In some examples, SMF 116 may be configured to transmit usage information at the end of each session, or at regular intervals during long-lived sessions. In some examples, SMF 116 may transmit the summary in the form of a usage record to CHF 112.

In some examples, the summary information may include session duration information, and/or a volume of data transmitted during a session. CHF 112 may collect one or more session summaries from SMF 116. Thus, the traffic pattern monitored by CHF 112 may include an amount of sessions established by IoT device 102 over a period of time, a total duration of session time including IoT device 102, a total volume of data transmitted by IoT device 102 over one or more sessions within a period of time, etc.

CHF 112 may include memory (not shown) which may store threshold ranges for IoT device 102. These threshold ranges may be determined from the expected traffic pattern behavior of IoT device 102 as determined by monitoring instructions 122. In another example, thresholds may be preconfigured by a user. In some examples, thresholds may be initially configured as presets and may be dynamically adjusted by CHF 112 based on monitored behavior of the IoT device 102. This may occur, for instance, at a configuration stage, or during testing of IoT device 102.

CHF 112 may also include instructions 124 to determine a traffic pattern deviation of IoT device 102. For example, IoT device 102 may exhibit an unexpected traffic pattern, i.e. by exceeding a traffic pattern threshold stored at CHF 112. In some examples, IoT device 102 may be determined to deviate from the expected traffic pattern range where IoT device 102 exceeds the threshold range set at CHF 112 a threshold amount of times within a particular time period. In some examples, IoT device 102 may be determined to deviate from the expected traffic pattern range where IoT device 102 exceeds the threshold range set at CHF 112 for a threshold duration of time.

In some examples, CHF 112 may achieve the functionality described above by working in concert with a Policy Control Function (PCF) 114, or a Policy and Charging Rules Function (PCRF) in combination with a PCF as in the case in $4^{th}$ Generation (4G) networks. For example, in an example instance where PCF 114 and CHF 112 are deployed at a same virtual or physical node, PCF 114 may monitor usage counters maintained by CHF 112 to determine which session policies to apply or modify. In some examples, different usage counters may be used to track the usage of different network services, e.g. telephony, messaging, mobile data, etc. In an example, PCF 114 may maintain usage thresholds or other policies specified by a subscription, user agreement, and/or specific network configuration. Policies maintained by PCF 114 may be modified by a user or in accordance with a configuration of PCF 114. When a threshold is exceeded or a trigger event occurs as governed by a policy of PCF 114, PCF 114 may generate an alert, restrict access to a network, change the status of a device, or take other action as governed by network policies specified at PCF 114.

For example, a subscription may have a monthly limit on mobile data transmitted and/or received by a device. The usage limit may be linked to a prepaid subscription and may be enforced by way of credit in the subscriber's account. At the end of a billing cycle, usage counters may be reset to 0 in preparation for a next billing cycle. If the subscriber exhausts all credit within a billing cycle as determined by PCF 114, PCF 114 may, for instance, deny the subscriber access to the network.

In some examples, PCF 114 and CHF 112 may be deployed at different physical or virtual nodes. In this instance, CHF 112 may store thresholds as described above, and CHF 112 may notify PCF 114 where a threshold is exceeded. Specifically, a threshold may be configured at CHF 112 and a spend limit control service may be used to notify PCF 114 when a traffic pattern deviates from the configured threshold.

As illustrated at FIG. 1, PCF 114 may include instructions 126 to monitor packet data of device 102. In an example, PCF 114 may monitor the packet data of device 102 responsive to being notified by CHF 112 of the threshold deviation, or responsive to determining that a number of usage counters at CHF 112 have deviated from a preconfigured threshold.

Specifically, CHF 112 may alert PCF 114 that a traffic pattern deviation occurred as determined by instructions 124. Monitoring packet data of device 102 may, in some examples, consume more resources than monitoring of the traffic pattern of device 102. Thus, while CHF 112 may, in some examples, perpetually monitor the traffic pattern of device 102, PCF 114 may begin monitoring the packet data of device 102 responsive to an alert generated by CHF 112 indicating a traffic pattern deviation has occurred, i.e. an indication that the traffic pattern exceeded a threshold maximum or minimum, or responsive to a determination by PCF 114 that a number of usage counters at CHF 112 has deviated from a threshold.

As an example, a counter may be incremented at CHF 112 whenever device 102 connects to the network. The counter may be reset periodically, e.g. once a day, once a billing cycle, etc. Prior to a counter reset, the counter value may be compared with the expected value determined through initial sampling as described in greater detail herein. In some examples, the traffic pattern being lower than the threshold range determined through sampling may be indicative of a connectivity or configuration problem. In some examples, the traffic pattern being higher than the threshold range determined through sampling may be indicative of a security or configuration problem.

In another example, anomalies in a transmitted volume of data may be monitored. To check for anomalies in volume data, the value of a counter used to collect session data usage over a predefined duration is compared periodically with the expected value of that counter over the same duration. For instance, the value of the counter may be compared with the expected value, e.g. when a first session is established each day, and an alert is raised if the usage deviated from the traffic pattern range by a threshold. In either example, an alert may be generated and/or PCF 114 may be alerted responsive to the determined threshold deviation from the expected traffic pattern.

As described above, CHF 112 may monitor the traffic pattern of device 102 according to instructions 122, which may refer to herein as "lightweight usage tracking." CHF 112 may detect a deviation, whereby CHF 112 may log the event, raise an alert, and/or activate finer-grained usage monitoring and traffic analysis. This finer-grained monitoring may be conducted by PCF 114 accordingly to instructions 126, e.g. through use of a Usage Monitoring Control (UMC) interface (not shown) of PCF 114. Finer-grained usage monitoring, where packet data anomalies are inspected, may be referred to herein as "IoT device profile troubleshooting." For longer-lived sessions, e.g., 24 hours, the switch from lightweight usage tracking to IoT device profile troubleshooting may occur mid-session. In other cases, the switch from lightweight usage tracking to IoT device profile troubleshooting may occur out of session.

PCF 114 may further include instructions to inspect whether any packet data anomalies were detected from the packet data transmitted or received by IoT device 102. In an example, PCF 114 may inspect whether any packet data anomalies were detected by instructing SMF 116 to collect data more frequently. For example, PCF 114 may instruct SMF 116 to send a usage summary every minute a session is occurring instead of at the end of the session. PCF 114 may otherwise turn on further packet detection rules at SMF 116. In this way, SMF 116 may report a more detailed usage summary, including but not limited to, what protocol is being used by packets transmitted or received by device 102, the destination address for packets transmitted or received by device 102, etc.

Specifically, PCF 114 may inspect whether the headers of packets transmitted or received by IoT device 102 are as expected. For example, the packet data transmitted by the device may be anomalous where the packet data includes a destination address not of a list of destination addresses associated with the group of devices. As another example, the device may be using an unexpected protocol to communicate. For example, PCF 114 may determine that a larger than expected percentage of packets transmitted by device 102 are Message Queuing Telemetry Transport Protocol (MQTT) packets. Specifically, IoT device 102 may be of a particular device type, e.g. a smart meter, and a vendor of device 102 may specify the expected behavior of a smart meter device, e.g. in a device profile. The device profile, may for example, detail the protocol type of packets transmitted by a smart meter, e.g. Lightweight Machine-to-Machine (LightweightM2M). In this example, PCF may determine that device 102 is exhibiting anomalous behavior by transmitted MQTT packets.

In another example, a device of a particular type may be configured to transmit packets of a first protocol for a first service flow, e.g. for configurations, and a second protocol for a second service flow, e.g. downloads. A device profile for the particular device type may specify an expected percentage range of packets transmitted with the first protocol and an expected percentage range of packets transmitted with the second protocol. In this example, PCF 114 may determine that device 102 exceeds a threshold percentage of packets transmitted of the first protocol. PCF 114 may similarly determine that device 102 exceeds a threshold percentage of packets transmitted of the second protocol. Accordingly, PCF 114 may determine that device 102 is exhibiting anomalous behavior where it is determined that device 102 is transmitting packets that deviate from an expected protocol, or that contain an unexpected destination address.

PCF 114 may further include instructions 130 to change a status of device 102 where it is determined from instructions 128 that the packet data is anomalous. Changing the status of IoT device 102 may include, for example, blocking device 102, i.e. prohibiting a device from initiating a new session. In another example, changing the status of IoT device 102 may include, for example, throttling IoT device 102 (e.g., in the case of a suspected Denial of Service (DoS) attack), including limiting the bandwidth of IoT device 102. In some examples, changing the status of IoT device 102 may include offloading traffic transmitted on a network slice of IoT device 102 to a different network slice, or otherwise rerouting traffic of the device. For example, if a service flow is considered to be suspicious, the service flow may be offloaded to a different network slice which include security monitoring.

As another example, changing the status of IoT device 102 may include updating the frequency at which IoT device 102 is monitored or otherwise inspected. Changing the status of IoT device 102 may further include, for example, reconfiguring parameters of device 102, including updating route selection policies of the device. Changing the status of the device may further include resetting the device to factory defaults, or otherwise rebooting the device.

Figure 2:
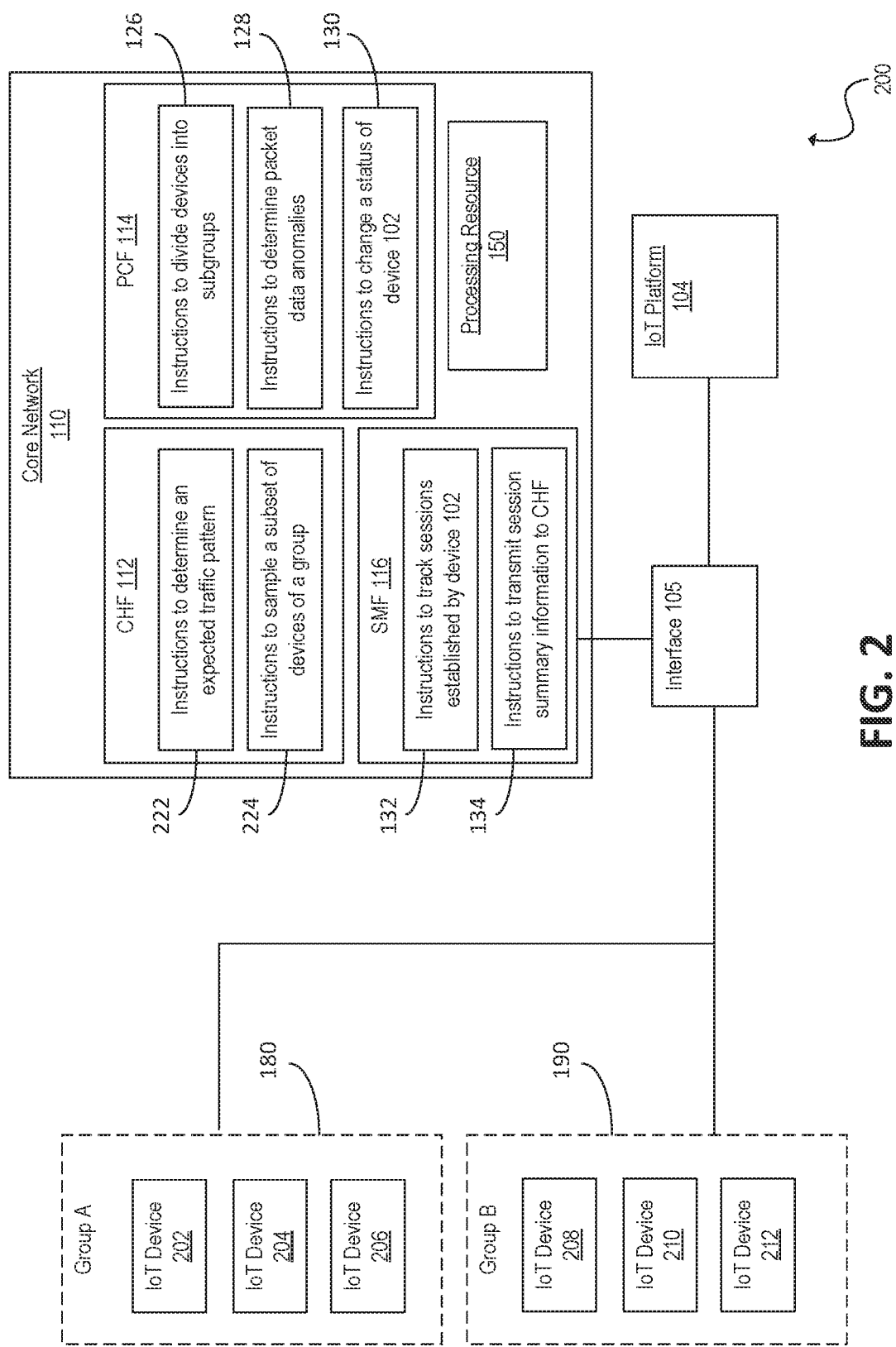
FIG. 2 is another example system including network functions having anomaly detection functionality for changing the status of a device.

FIG. 2 is another example system 200 including network functions having anomaly detection functionality. FIG. 2 may include similar architecture to that described in FIG. 1, including core network 110 having CHF 112, SMF 116, PCF 114, and processing resource 150. FIG. 2 may further include similar components including IoT Platform 104 and interface 105. CHF 112 may include any combination of instructions illustrated at CHF 112 in example FIG. 1 and FIG. 2. Similarly, PCF 114 and SMF 116 may include any combination of instructions illustrated at PCF 114 and SMF 116, in example FIG. 1 and FIG. 2 respectively. To determine threshold traffic pattern deviations to be set at CHF 112, or in some cases PCF 114, an average traffic pattern for a group of devices may be determined. A number of example devices and groups are illustrated in FIG. 2, including devices 202-206 of Group A 180, and devices 208-212 of Group B 190. Two example groups and six devices are shown for purposes of clarity and conciseness, however any number of groups and devices may be implemented. In some cases, thousands, or even millions of devices by grouped and monitored as will be described in further detail below.

In some examples, CHF 112 may include instructions 222 to determine an expected traffic pattern of at least a subset of a group of devices. For example, CHF 112 may monitor the traffic pattern of IoT devices 202-206 of Group A 180 for a predetermined period of time, and from the monitored frequencies derive an expected traffic pattern of devices of Group A 180. The expected traffic pattern may include, for example, an expected number of sessions established over a period of time for a device in Group A 180, an expected duration of time sessions are established over a period of time for a device in Group A 180, an expected volume of data transmitted over a period of time by a device in Group A 180, etc.

In some examples, CHF 112 may include instructions 224 to monitor a subset of devices of Group A 180. For example, to conserve resources such as compute and storage overhead, CHF may sample a random selection of devices of Group A to derive an expected traffic pattern for a device of Group A. This may be useful where a group includes a large number of devices, e.g., thousands or millions of devices. In some examples, CHF 112 may periodically monitor a subset of devices and may update the expected traffic pattern periodically. As an example, CHF 112 may monitor 1-2% of the devices of a group over a one month time period. CHF 112 may derive the expected traffic pattern from the results and may refresh the expected traffic pattern annually.

In some examples, the expected traffic pattern of a group may be an average traffic pattern derived from sampling the subset of devices in the group. In other examples, other calculations may be used to derive an expected traffic pattern from the monitored sampling, as well as an expected frequency range of the devices within the group, including expected maximum and minimums. In some examples, CHF 112, or in some cases PCF 114, may maintain threshold ranges from expected traffic behavior for multiple groups. Therefore, the expected traffic pattern range of Group A 180 may be different from the expected traffic pattern range of Group B 190.

In some examples, a device may be assigned to a group upon setup, initialization, configuration, etc. In some examples, a new device, e.g. a device being onboarded, may be monitored for a predetermined time to derive a traffic pattern range of the device. The device may thereby be assigned to a group of devices where the derived traffic pattern range of the device is within a range of the expected traffic pattern of the group of devices. For instance, PCF 114 may include instructions to divide a group of devices, e.g. devices 202-212 into subgroups of devices according to determined traffic pattern ranges. Thus, during an initial setup phase for examples, devices having similar traffic pattern frequencies may be grouped together. In this illustrative example, devices 202-206 of Group A 180 may exhibit a first expected traffic pattern range, and devices 208-212 of Group B 190 may exhibit a second expected traffic pattern range.

In some examples, a device may be assigned to a group based on configuration parameters, complexity, a physical location and/or virtual network slice upon which the device is deployed, an assignment of the device (e.g. monitoring a particular object or environment), a particular use case, etc. In a multi-tenant environment, a tenant or device owner may manually select a group for a device.

Figures 3A, 3B, 3C:
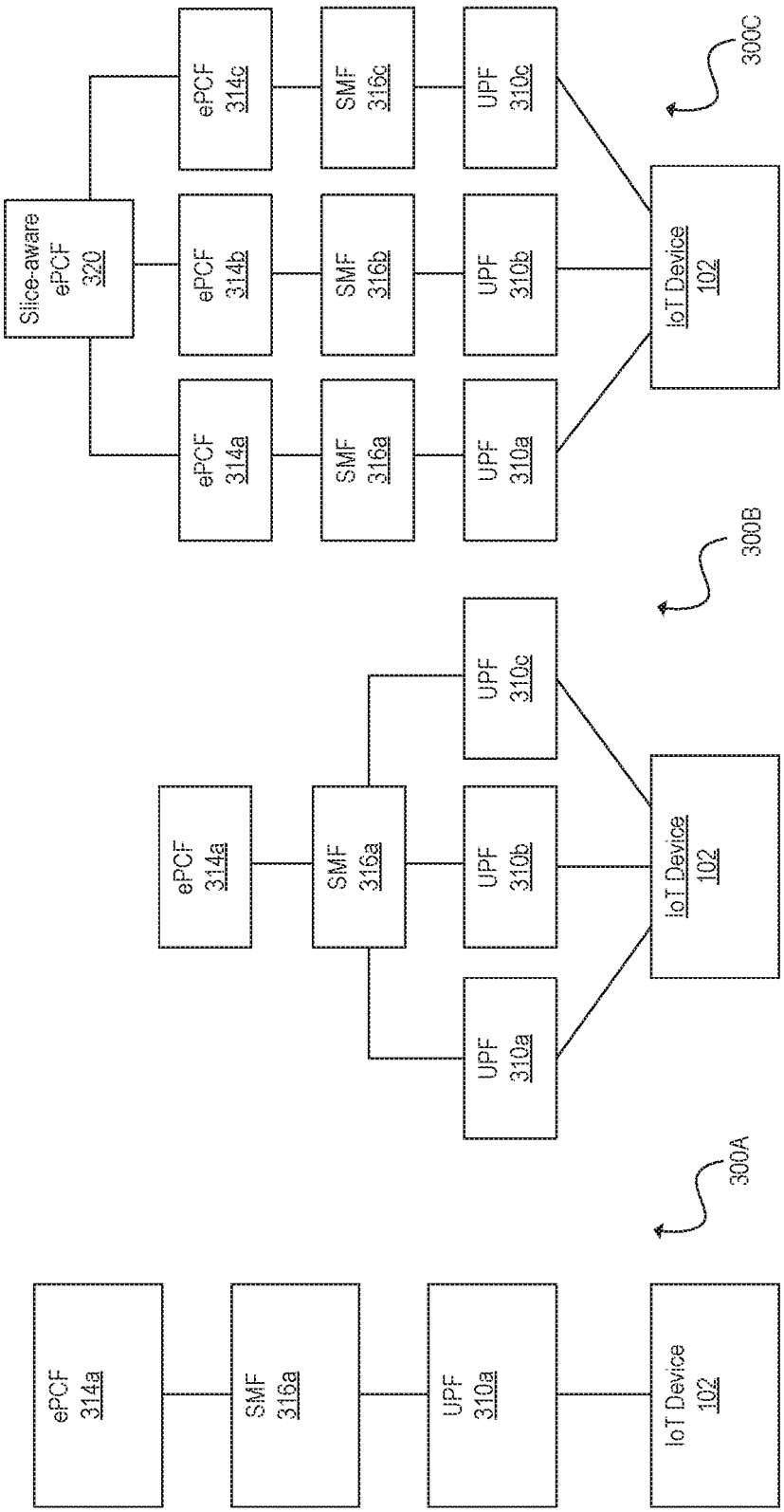
FIGS. 3A, 3B, and 3C are block diagrams of example network function topologies for monitoring device anomalies.

FIGS. 3A, 3B, and 3C are block diagrams of example topologies, 300a, 300b, and 300c respectively, for monitoring IoT device anomalies, FIG. 3A is an example topology for a single network slice, or a network that is not partitioned into virtualized and independent logical networks. In this example, flows may be managed by a single SMF 316a, which may include similar architecture to SMF 116 as described with respect to FIG. 1.

In the example topologies illustrated at FIG. 3, an extended PCF (ePCF) 314 is utilized. The ePCF 314, similar to the functionality of CHF 112 as described above with respect to FIG. 1 and FIG. 2, may include an offline charging interface to collect usage information from SMF 316. In some examples, ePCF may include this functionality where a CHF 112 is not deployed at the network or the network slice at which ePCF is deployed. For instance, ePCF 314 may include the functionality of PCF 114 as described above with respect to FIG. 1 where CHF 112 is present in the network. Where no CHF 112 is present in the network, ePCF 314 may include the functionality of PCF 114 as well as the functionality as described above with respect to CHF 112.

Topology 300a may include device 102 as described above with respect to FIGS. 1 and 2, which may be monitored by ePCF 314a as described above. Specifically, SMF 316a may collect session data via UPF 310a and may transmit session summary information of device 102 to ePCF 314a. In another example topology 300B, different access networks may be deployed for different IoT service flows.

A service flow identifies the exchange of data between an IoT device and an application and/or application feature. In some examples, an IoT device may support multiple service flows. For instance, a service flow for reporting, a service flow for management operations, a service flow for troubleshooting, etc. In some examples, each service flow may use a different protocol, with different policies associated with each. For example, a higher priority or higher Quality of Service (QoS) may be applied for critical service flower, a lower priority or lower QoS for background maintenance tasks, etc. Furthermore, in a multi-slice network, different service flows from the same IoT device may use different network slices. In this example however, each service flow may be managed by single SMF 316a and ePCF 314a.

In yet another example topology 300c, IoT service flows may be split across multiple network slices, each network slice having its own SMF 316 and ePCF 314. In this example, a slice-aware ePCF 320 may be utilized to consolidate usage data and make cross-slice policy decisions. For example, ePCF 314 may monitor traffic pattern data and/or packet data of device 102. In the example topology of 300c, each of ePCF 314a, 314b, and 314c respectively may monitor traffic pattern data and/or packet data of device 102 at a respective network slice. Slice-aware ePCF 320 may collect monitored data from each network slice to determine whether there are anomalies with respect to traffic data across different network slices, and enforce cross-slice policy decisions.

For example, device 102 may be configured to operate across multiple network slices. Device 102 for instance, may be configured to use a primary slice as a preferred slice, and a secondary slice as a backup, e.g. in the event the primary slice in inaccessible. Each ePCF 314, through sampling, may determine the amount of traffic generated across its respective network slice, and slice-aware ePCF 320 may determine what percentage of traffic was generated across each network slice by device 102. Slice-aware ePCF 320, in some examples, may generate an alert if it detects a higher than expected amount of traffic generated by device 102 on the secondary slice over the primary slice. In some examples, where slice-aware ePCF 320 is monitoring multiple devices, ePCF 320 may generate an alert where it detects a higher than expected number of devices using the secondary slice over the primary slice.

Figure 4:
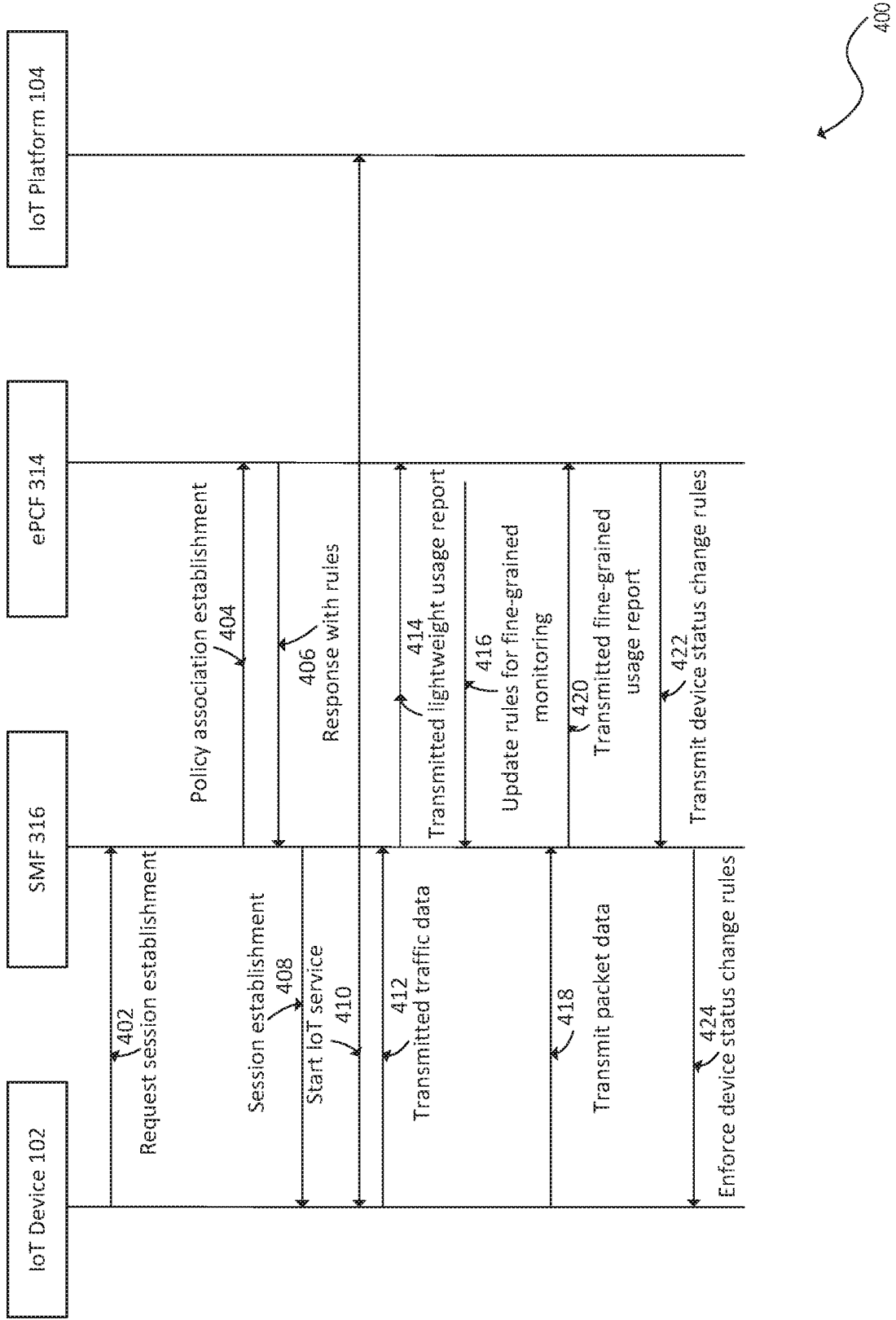
FIG. 4 is a sequence diagram illustrating an example process for device anomaly detection.

FIG. 4 is a sequence diagram 400 illustrating an example process for device anomaly detection. For purposes of clarity and conciseness, FIG. 4 includes device 102, SMF 316, and ePCF 314 of FIG. 3, as well as IoT platform 104 of FIG. 1. As described above, ePCF 314 may include the functionality of PCF 114 as well as the functionality described above with respect to CHF 112 of FIG. 1.

At 402, device 102 may request to establish a session. The session establishment request may be received by SMF 316. SMF 316, responsive to receiving the request may select the appropriate ePCF for connection based on a profile of device 102. For example, the profile of device 102 may be retrieved from a subscription profile repository in the case of 4G networks, or a User Data Repository (UDR) in the case of 5G networks, and passed to ePCF 114. In some examples, ePCF 314 may query a UDR for a profile of device 102. SMF 316 may, in some examples, select ePCF 314, and at 404 policy association establishment may occur. The ePCF 314 may, in some examples, populate policy and charging control rules in accordance with the profile of device 102. The ePCF 314 may in some examples select ePCF 314 as an online or offline charging destination. In some examples, ePCF 314 may initialize or otherwise update usage counters for tracking session establishments associated with device 102. For instance, ePCF 314 may increase a counter responsive to the policy association establishment.

At 406, ePCF 314 may respond to SMF 316 with the policy and charging control rules, and SMF 316 may create a session to initiate a service. At 408, the session may be established, and at 410, the IoT service between IoT device 102 and IoT platform 104 may begin. In some examples, SMF 316 may, at 410, initiate lightweight usage tracking of device 102. As described above, lightweight usage tracking may refer to the continuous monitoring of a traffic pattern of device 102.

At 412, traffic data associated with device 102 may be received by SMF 316. In some examples, the traffic data may be received by SMF 316 through a UPF where a UPF is implemented. SMF 316 may, at 414, transmit traffic frequency data in the form of a usage report to ePCF 314. In some examples, ePCF 314, as described above, may determine a traffic pattern deviation of device 102. Specifically, and as described in greater detail above, device 102 may be determined to deviate from an expected traffic pattern range where device 102 exceeds a threshold range set at ePCF 314.

Responsive to a determination that device 102 has deviated from an expected traffic pattern, ePCF 314 may switch to a troubleshooting mode. As described above, the troubleshooting mode may include finer-grained usage monitoring, and specifically, the inspection of packet data anomalies as transmitted or received by device 102. Thus, responsive to the determination that device 102 has deviated from the expected traffic pattern, ePCF 314 may update policy and charging control rules at 416 to enable finer-grained monitoring by SMF 316.

At 418, SMF 316 may receive packet data associated with device 102. At 420, SMF 316 may transmit the received packet data as a fine-grained usage report to ePCF 314. PCF 314 may determine whether any packet data anomalies were detected from one or more packet data usage reports.

Responsive to ePCF 314 detecting anomalies in the packet data usage report, ePCF 314 may, at 422, transmit updated policy and control rules to SMF 316 in accordance with a change of status of device 102. These updated policy and control rules may include, for example, blocking device 102, i.e. prohibiting a device from initiating a new session for a period of time. In another example, changing the status of device 102 may include, for example, throttling device 102 or offloading service flows transmitted on a network slice of device 102 to a different network slice. In some examples, SMF 316 may enforce the updated policy and control rules associated with device 102. In another example, where a UPF is implemented, the UPF may enforce the updated policy and control rules.

In an example, a change of status of device 102 may include the enforcement of different policy and control rules responsive to a session establishment request at 402. For example, responsive to a determination that packet data associated with device 102 was anomalous, ePCF 314 may prohibit device 102 from initiating a new session for a period of time. After the period of time has expired, and device 102 initiates a new session, e.g. at 402, associated policies at 404 may include finer-grained monitoring of device 102. In another example, after the period of time has expired device 102 may be throttled or service flows from device 102 may be offloaded to a different slice.

Figure 5:
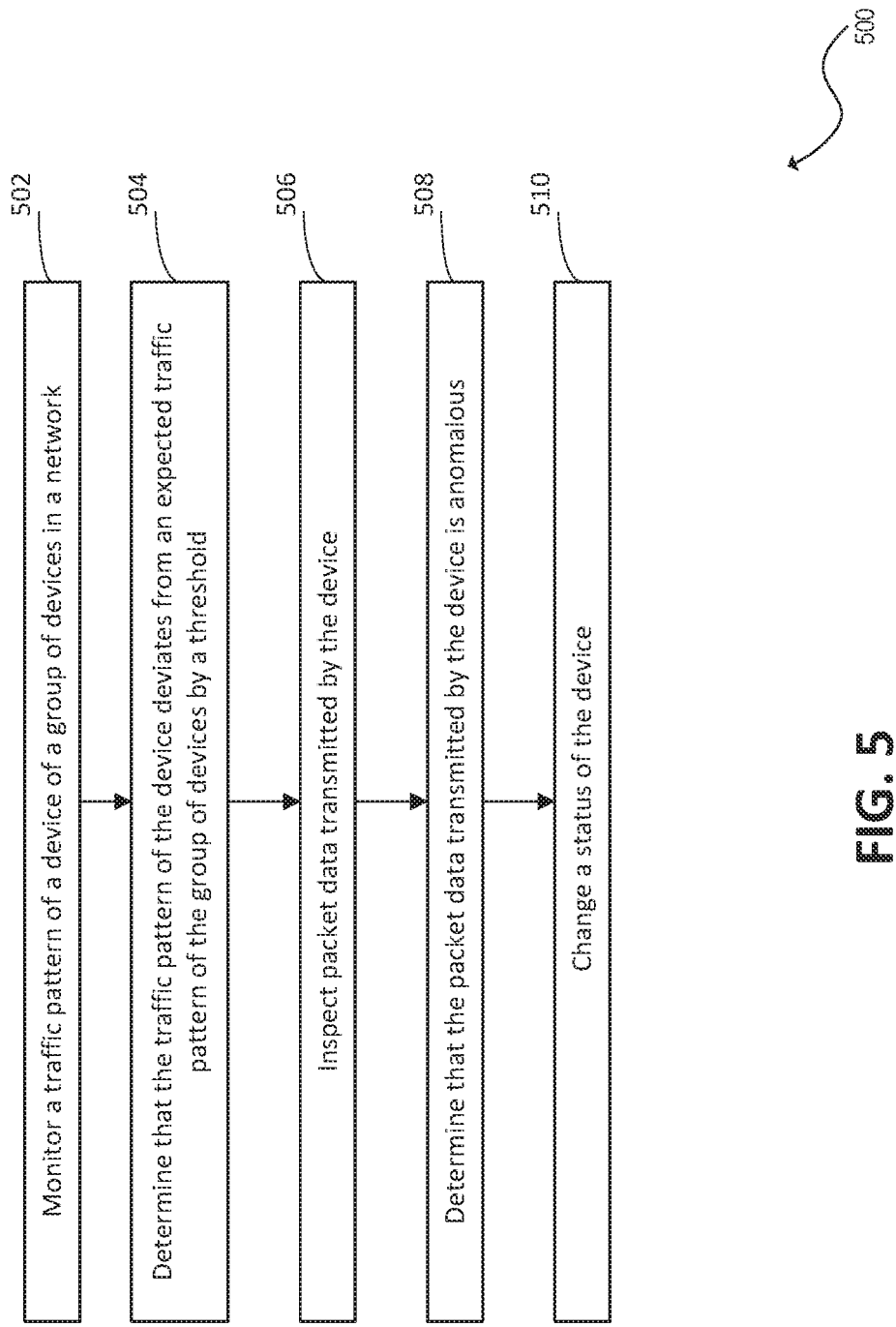
FIG. 5 is a flowchart illustrating a method for changing the status of a device responsive to a device anomaly determination.

FIG. 5 is a flowchart illustrating a method 500 for changing the status of a device responsive to a device anomaly determination. Although execution of method 500 is described below with reference to core network 110 of FIG. 1, this is for explanatory purposes and other suitable components for execution of method 500 may be utilized. Method 500 may be implemented in the form of executable instructions stored on a machine-readable storage medium and/or in the form of electronic circuitry, e.g. hardware. In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At block 502, a traffic pattern of a device may be monitored, e.g. by CHF 112 or ePCF 314 of FIG. 3 or 4. In some examples, the traffic pattern monitored may include an amount of sessions established by IoT device 102 over a period of time, a total duration of session time including IoT device 102, a total volume of data transmitted by IoT device 102 over one or more sessions within a period of time, etc.

At block 504, a traffic pattern deviation may be determined from the monitored traffic pattern data. For example, a monitored IoT device may exhibit an unexpected traffic pattern, i.e. by exceeding a traffic pattern threshold stored at CHF 112. In some examples, the IoT device may be determined to deviate from the expected traffic pattern range where IoT device exceeds the threshold range set at CHF 112 a threshold amount of times within a particular time period. In some examples, the IoT device may be determined to deviate from the expected traffic pattern range where IoT device exceeds the threshold range set at CHF 112 for a threshold duration of time.

At block 506, packet data transmitted by the device may be inspected, e.g. by PCF 114, responsive to a determination that the device deviated from the expected traffic pattern. At block 508, it may be determined that the packet data transmitted by the device is anomalous. For example, the packet data transmitted by the device may be anomalous where the packet data includes a destination address not of a list of destination addresses associated with the group of devices.

At block 508, a status of the device may be changed, e.g. by PCF 114, responsive to the determination that the packet data transmitted by the device was anomalous. Changing the status of the device may include, for example, blocking the device, i.e. prohibiting a device from initiating a new session, or throttling the device, including limiting the bandwidth of the device. In some examples, changing the status of the device may include offloading service flows transmitted on a network slice of the device to a different network slice. Accordingly, a device status may be changed responsive to device monitoring and anomaly detection.

Figure 6:
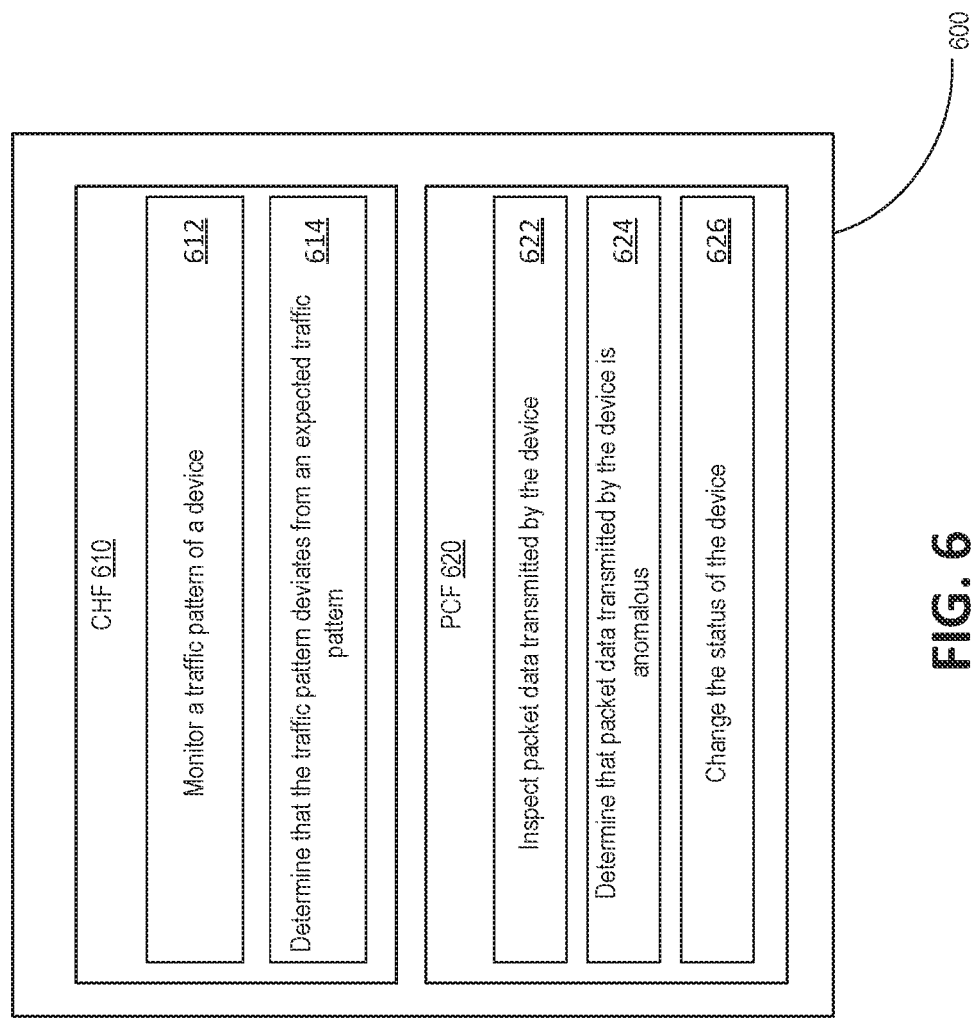
FIG. 6 is a block diagram of an example system for device anomaly detection.

FIG. 6 is a block diagram of an example system 600 for device anomaly detection. System 600 may include CHF 610 and PCF 620. CHF 610 may include similar components and/or instructions to CHF 112 of FIG. 1 as described above. Similarly, PCF 620 may include similar components and/or instructions to PCF 114 of FIG. 1 as described above. Specifically, CHF 610 may include processor executable instructions 612 to monitor a traffic pattern of a device. CHF 610 may further include instructions 614 to determine that the monitored traffic pattern deviates from an expected traffic pattern.

PCF 620 may include processor executable instructions 622 to monitor packet data transmitted by the device. In some examples, PCF 620 may monitor packet data transmitted by the device responsive to the determination by CHF 610 that the traffic pattern of the device deviated from the expected traffic pattern. PCF 620 may further include processor executable instructions 624 to determinate that the packet data transmitted by the device is anomalous, and instructions 626 to change the status of the device responsive to the determination.

Figure 7:
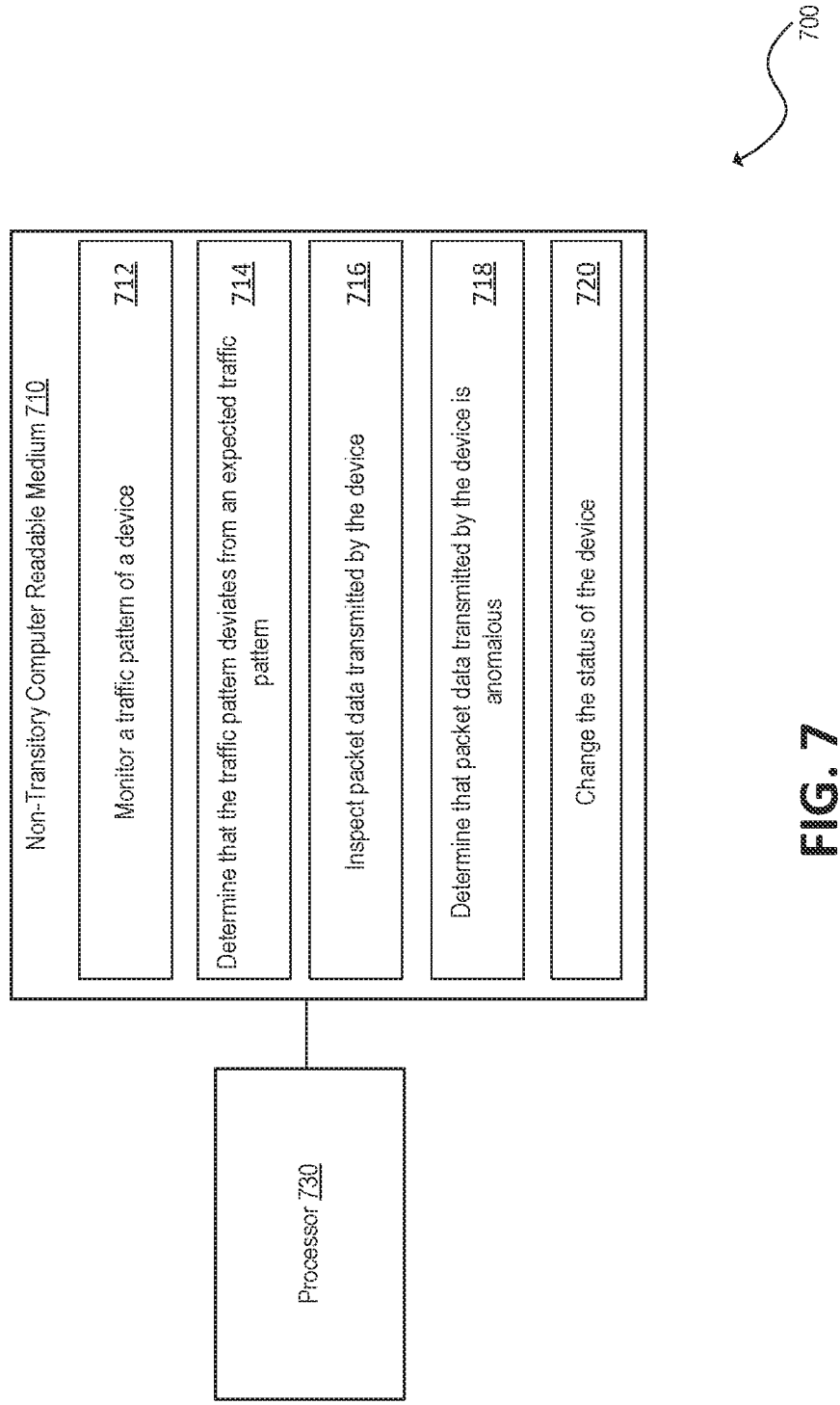
FIG. 7 is an example block diagram illustrating a non-transitory computer readable medium for changing the status of a device responsive to a detected anomaly.

FIG. 7 is an example block diagram 700 illustrating a non-transitory computer readable medium 710 including processor executable instructions 712-720 for changing the status of a device responsive to a detected anomaly. Non-transitory computer readable medium 710 may be implemented in a single device or distributed across devices. Likewise, processor 730 may represent any number of physical processors capable of executing instructions stored by computer readable medium 710.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture). An article or article of manufacture may refer to any manufactured single component or multiple components.

Processor 730 may be a Central Processing Unit (CPU), Graphics Processing Unit (GPU), microprocessor, and/or other hardware device suitable for retrieval and execution of instructions stored in computer readable medium 710. Processor 730 may fetch, decode, and execute program instructions 712-720, and/or other instructions. Similarly, processor 730 may fetch, decode, and execute program instructions 712-720. As an alternative or in addition to retrieving and executing instructions, processor 730 may include at least one electronic circuit comprising a number of electronic components for performing the functionality of instructions 712-720, and/or other instructions. Similarly, processor 730 may include at least one electronic circuit comprising a number of electronic components for performing the functionality of instructions 712-720, and/or other instructions.

Computer readable medium 710 may include instructions 712-720, the instructions executable by processor 730. Computer readable medium 710, may, for example, include instructions 712 to monitor a traffic pattern of a device, e.g. device 102 of FIG. 1. In some examples, the traffic pattern monitored may include an amount of sessions established by the device over a period of time, a total duration of session time including the device, a total volume of data transmitted by the device over one or more sessions within a period of time, etc.

Computer readable medium 710 may further include instructions 714 to determinate that the monitored traffic pattern deviates from an expected traffic pattern. For example, a monitored device may exhibit an unexpected traffic pattern, e.g. by exceeding a traffic pattern threshold stored at CHF 112. In some examples, the device may be determined to deviate from the expected traffic pattern range where the device exceeds a threshold range by a threshold amount of times within a particular time period. In some examples, the device may be determined to deviate from the expected traffic pattern range where the device exceeds the threshold range for a threshold duration of time. In some examples, the device may be determined to deviate from the expected traffic pattern range where the device transmits a minimum or maximum threshold volume of data within a period of time.

Computer readable medium 710 may further include instructions 716 to inspect packet data transmitted by the device, e.g. by PCF 114, responsive to a determination that the device deviated from the expected traffic pattern.

Computer readable medium 710 may include instructions 718 to determine that the packet data transmitted by the device is anomalous. For example, the packet data transmitted by the device may be anomalous where the packet data includes a destination address not of a list of destination addresses associated with the group of devices.

Computer readable medium 710 may include instructions 720 to change a status of the device, e.g. by PCF 114, responsive to the determination that the packet data transmitted by the device was anomalous. Changing the status of the device may include, for example, blocking the device, i.e. prohibiting a device from initiating a new session, or throttling the device, including limiting the bandwidth of the device. In some examples, changing the status of the device may include offloading service flows transmitted on a network slice of the device to a different network slice.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:
1. A method comprising:
monitoring, via a Charging Network Function (CNF), a traffic pattern of a device of a group of devices in a network;
determining, via the CNF, that the traffic pattern of the device deviates from an expected traffic pattern of the group of devices by a threshold;

responsive to determining that the device deviates from the expected traffic pattern, inspecting, via a Policy Control Function (PCF), packet data transmitted by the device;

determining, via the PCF, that the packet data transmitted by the device is anomalous; and responsive to determining that the packet data transmitted by the device is anomalous, changing, via the PCF, a status of the device.

2. The method of claim 1, wherein a traffic pattern includes at least one of an amount of sessions established over a period of time, a total duration of time sessions are established over the period of time, or a volume of data transmitted over the period of time.

3. The method of claim 1, wherein the device may be determined to deviate from the expected traffic pattern where the device establishes a session over a second network slice at a greater than expected frequency than a first network slice.

4. The method of claim 1, wherein the packet data transmitted by the device is determined to be anomalous where the packet data includes a destination address not of a list of destination addresses associated with the group of devices.

5. The method of claim 1, further comprising tracking, by a Session Management Function (SMF), each session established by the device; and transmitting, by the SMF, session summary information associated with the device to the CNF.

6. A system comprising:
a processing resource; and
a non-transitory computer readable storage medium comprising instructions executable by the processing resource to:
monitor, via a Charging Network Function (CNF), a traffic pattern of a device of a group of devices in a network; and
determine, via the CNF, that the traffic pattern of the device deviates from an expected traffic pattern of the group of devices by a threshold; and
responsive to determining that the device deviates from the expected traffic pattern, inspect, via a Policy Control Function (PCF), packet data transmitted by the device;
determine, via the PCF, that the packet data transmitted by the device is anomalous; and
responsive to determining that the packet data transmitted by the device is anomalous, changing, via the PCF, a status of the device.

7. The system of claim 6, wherein a traffic pattern includes at least one of an amount of sessions established over a period of time, a total duration of time sessions are established over the period of time, or a volume of data transmitted over the period of time.

8. The system of claim 7, further comprising a Session Management Function (SMF) to:
track each session established by the device; and
transmit session summary information associated with the device to the CHF.

9. The system of claim 8, wherein the SMF spans multiple instances, each SMF instance deployed at each network slice in the network.

10. The system of claim 6, wherein changing the status of the device includes at least one of disabling the device, prohibiting the device from starting a new session, or throttling the device.

11. The system of claim 6, wherein changing the status of the device includes assigning the device to a different network slice.

12. A non-transitory computer readable medium including instructions thereon, wherein the instructions, when executed by a processor, cause the processor to:
monitor, via a Charging Network Function (CNF), a traffic pattern of a device of a group of devices in a network;
determine, via the CNF, that the traffic pattern of the device deviates from an expected traffic pattern of the group of devices by a threshold;
responsive to determining that the device deviates from the expected traffic pattern, inspect, via a Policy Control Function (PCF), packet data transmitted by the device;
determine, via the PCF, that the packet data transmitted by the device is anomalous; and
responsive to determining that the packet data transmitted by the device is anomalous, change, via the PCF, a status of the device.

13. The non-transitory computer readable medium of claim 12, further comprising instructions to determine an average traffic pattern of at least a subset of the group of devices, wherein the expected traffic pattern of the group of devices is the determined average traffic pattern.

14. The non-transitory computer readable medium of claim 13, wherein determining the average traffic pattern of at least a subset of the group of devices comprises instructions to sample a number of devices of the group of devices periodically.

15. The non-transitory computer readable medium of claim 14, further comprising instructions to divide the group of devices into subgroups of devices, wherein the group of devices is divided according to determined traffic pattern ranges.

16. The non-transitory computer readable medium of claim 15, further comprising instructions to, upon onboarding a new device, assign the new device to the group of devices where the new device exhibits a traffic pattern within a range of the expected traffic pattern of the group of devices.

17. The non-transitory computer readable medium of claim 12, wherein changing the status of the device includes at least one of disabling the device, prohibiting the device from starting a new session, or throttling the device.

18. The non-transitory computer readable medium of claim 12, wherein changing the status of the device includes moving a service flow of the device to a different network slice.

* * * * *